Aug. 9, 1927.  
H. WILLSHAW  
1,638,023  
TIRE MOLD  
Filed Oct. 13, 1924  
2 Sheets-Sheet 1

Inventor  
HARRY WILLSHAW  
By his Attorney

Aug. 9, 1927.
H. WILLSHAW
TIRE MOLD
Filed Oct. 13, 1924
1,638,023
2 Sheets-Sheet 2
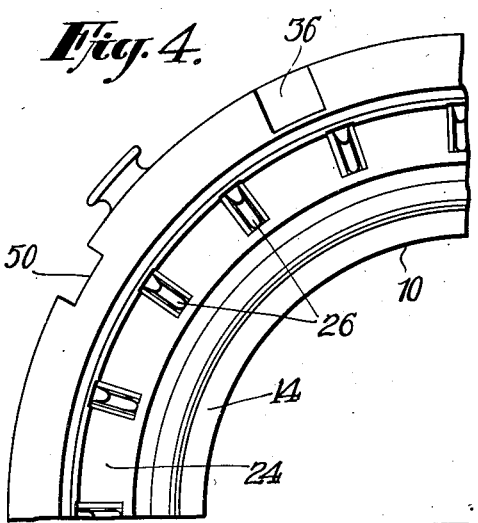
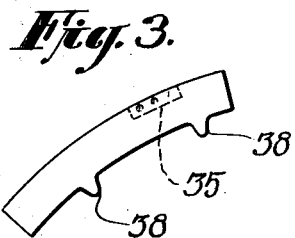
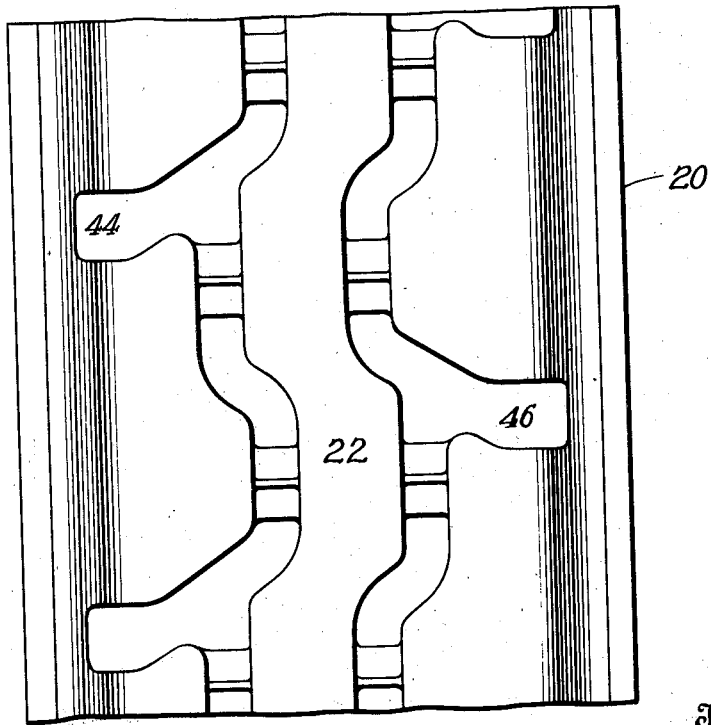
Inventor
HARRY WILLSHAW
By his Attorney Patented Aug. 9, 1927.

1,638,023

UNITED STATES PATENT OFFICE.

HARRY WILLSHAW, OF BUFFALO, NEW YORK, ASSIGNOR TO DUNLOP TIRE AND RUBBER CORPORATION OF AMERICA, OF BUFFALO, NEW YORK, A CORPORATION OF NEW YORK.

TIRE MOLD.

Application filed October 13, 1924. Serial No. 743,184.

This invention relates in general to molds and in particular to improvements in molds used for the manufacture of rubber tires and the method of producing such molds. The invention will be understood from the following specification when read in connection with the accompanying drawings in which Fig. 1 is an end elevation of a mold made according to my invention and embodying features of novelty hereinafter more fully pointed out.

Fig. 3 is a face view of a portion of a steel shell forming part of the mold.

Fig. 4 is a face view of a portion of a tread ring forming part of the mold.

Fig. 5 is a partial plan view of a tire the tread of which is formed by the mold shown in the above figures.

Figure 1:
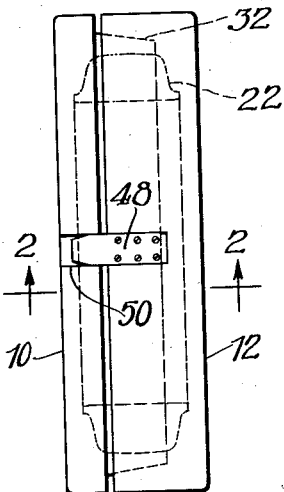
Figure 2:
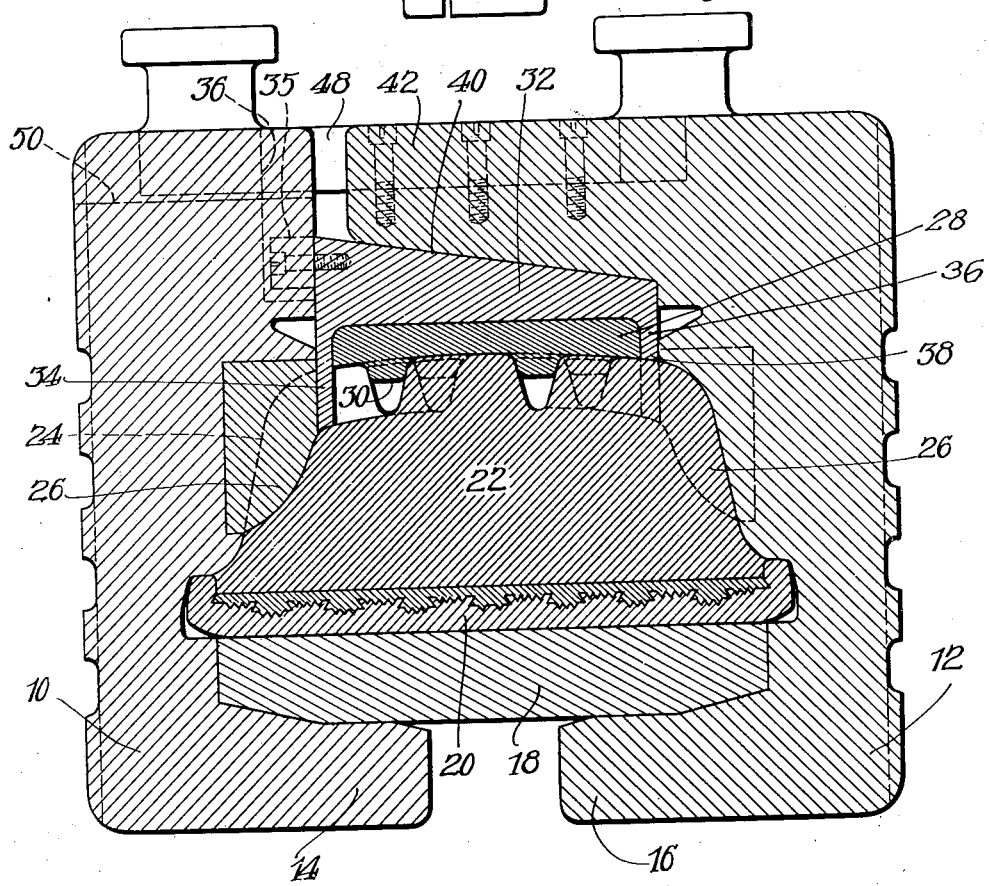
Fig. 2 is an enlarged transverse section through the mold, taken on line 2—2 of Fig. 1.

Referring in detail to the drawings, the mold includes a bottom ring or mold section 10 and a top ring or mold section 12, which parts are formed with inwardly extending flanges 14 and 16 for engagement with a ring 18. The latter forms a bearing for the metallic base band 20 of a rubber tire of the solid or semisolid type such as indicated at 22 which is adapted to be formed and vulcanized in the mold forming the subject matter of my invention. The mold sections 10 and 12 are each formed with suitable recess and at spaced intervals around the periphery inserts or side pieces 26 are secured in the recesses in the respective mold sections in order to form indentations in the side walls of the tire. These inserts are preferably made of a metal or metal alloy containing aluminum, magnesium, manganese, chromium and copper which can be easily cast with a very smooth surface of extremely fine grain. The inserts or side pieces may be welded, screwed or otherwise secured to the molded sections, and while I have used the term "inserts", it is to be understood that they are not necessarily seated in sockets formed in the molded sections.

The tread portion of the tire 22 is molded or shaped by a tread ring 28 which is formed with suitable projections 30 shaped and proportioned to produce the desired configuration of tire tread design. These projections are of necessity in many cases irregular in shape. The design and arrangement of the projections, of course, varies with the particular type of tire tread to be produced. Heretofore it has been the practice to form such tread mold projections by machining them to the desired shape. This entails expensive profiling operations and often calls for the provision of master patterns or templates for use on profiling machines to guide the cutters thereof. My invention overcomes the necessity of such machine work and eliminates the expensive profiling operation. This is accomplished by casting the tread ring 28 from aluminum or a similar metal alloy which can be cast to the required size with the necessary projections and depressions formed integral therewith for molding the tire tread. Aluminum and varying alloys thereof, such as used in making die-castings, can be cast in such a way that its surface is for all practical purposes just as smooth as that produced by a machined mold.

The tread ring 28, if desired, may be cast in one continuous ring or it may be made up of a plurality of segments. When the ring is made in segments I preferably provide a steel shell 32 having flanges 34 and 36 embracing the side walls of the tread ring. This steel shell has secured to one edge thereof a locating block 35 which is adapted to engage a slot 36 in the ring 10 when the mold is assembled. Extending radially inward from the flanges 34 of the steel shell are a series of projections 38 which are spaced angularly the same distance apart as the side pieces 26 of the mold sections 10 and 12. The projections 38 and side pieces 26 are held in register with one another by the block and slot joint 35—36 above mentioned.

The outer surface 40 of the shell 32 is tapered to fit the tapered bore of the outer annular flange 42 of the mold section 12.

In the particular design of tire tread illustrated in Fig. 5 it will be noted that the depressions 44 and 46 on the opposite side of the tire are in staggered relation. These are formed by the side pieces 26 of the respective mold sections 10 and 12, as will be readily appreciated.

To secure this relationship or any other desired relationship between the side pieces on the respective mold sections I provide a dowel 48 secured to one section which is adapted to enter a slot 50 in the other section.

While I have illustrated a mold for shaping the tread of a solid tire it is not to be inferred that I am limited thereto, as the same can also be used for molding balloon and regular style pneumatic tire casings.

While I have described with great particularity the construction of the specific mold illustrated and the method of forming parts thereof by casting them to shape instead of machining them, it is not to be construed that I am limited thereby, as various modifications may be made without departing from the invention as defined in the appended claims.

What I claim is:

1. A tire mold including top and bottom rings of relatively tough metal having die cast side pieces secured at peripherally spaced intervals to each of said mold rings, a supporting shell adapted to be clamped between the mold rings and an unmachined cast tread ring secured to said shell and having integral projections and depressions adapted to serve as a mold for the tread surface of the tire.

2. A tire mold including top and bottom mold rings of relatively tough metal, die cast inserts secured at spaced intervals to each of said mold rings and adapted to serve as cores for depressions in the tires formed in the mold, a supporting shell having inwardly extending flanges which engage said side pieces in the assembled mold and an unmachined die cast tread ring secured to said shell between said flanges, said tread ring being provided with projections and depressions proportioned to produce the desired configuration of tire tread design.

In witness whereof I have hereunto signed my name.

HARRY WILLSHAW.